United States Patent Office 3,349,503
Patented Oct. 31, 1967

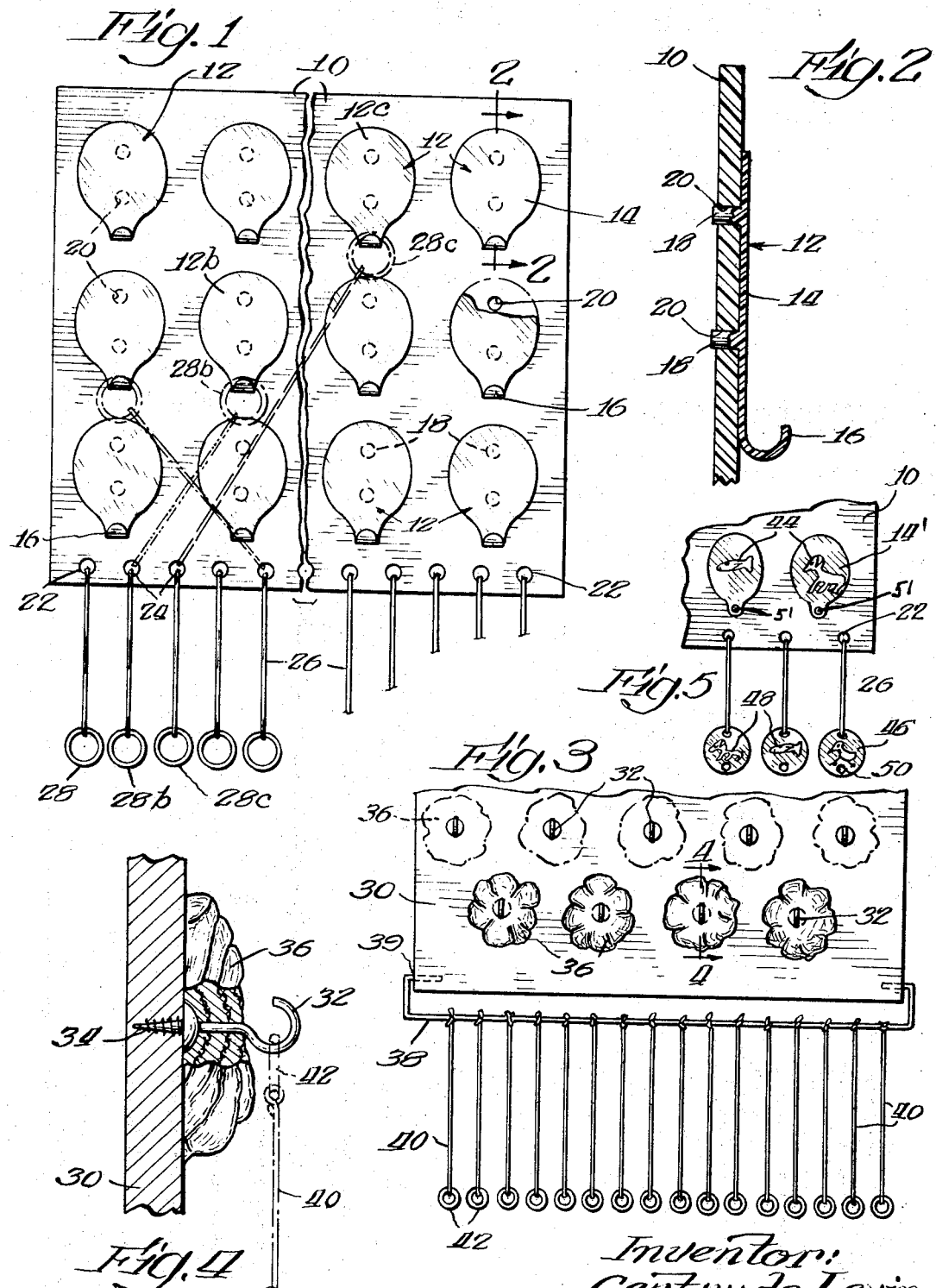

3,349,503
CHILD'S EDUCATIONAL TOY
Gertrude Levin, 841 Oak Drive,
Glencoe, Ill. 60022
Filed Oct. 20, 1965, Ser. No. 498,627
7 Claims. (Cl. 35—8)

This invention relates to a child's educational toy.

One of the objects of this invention is to provide an educational toy for young children which will serve to teach a child to coordinate colors or objects and will also serve to evaluate the child's ability to coordinate or match up objects, colors, or the like. This may be accomplished while making a game of the procedure and providing amusement for the child.

Other objects will become apparent as this description progresses.

In the drawings:

FIGURE 1 is a broken front view of the educational toy forming this invention.

FIGURE 2 is an enlarged sectional view taken on line 2—2 of FIGURE 1.

FIGURE 3 is a front view of a modification.

FIGURE 4 is an enlarged sectional view taken on line 4—4 of FIGURE 3, and

FIGURE 5 is a front view of a further modification.

Referring to FIGS. 1 and 2, the educational toy includes a board 10, which may be made of plastic, wood, or any rigid material. Supported on said board in spaced relation are members, generally indicated at 12, which comprise a generally disk-shaped body or plate 14 which has a hook member 16 extending downwardly of the bottom of said disk body. Projecting from the rear of the disk is a pair of spaced pins 18. The member 12 may be made of plastic material and may be integrally molded.

The board 10 is formed with a plurality of pairs of spaced openings 20, each pair of openings receiving the pair of spaced pins 18 of a member 12. The pins are suitably anchored in the openings to firmly affix member 12 to the board.

The lower end of the board 10 is provided with a row of spaced openings 22, and secured to each opening, as at 24, is an elastic member 26 which has secured to its opposite end a ring 28. The rings 28 normally hang suspended, as shown in FIG. 1.

The members 12 each may be formed of a different color if molded or made of plastic, or if otherwise formed may be suitably colored. The rings 28 likewise are each formed of a different color, with the color matching the color of one of the members 12.

The purpose of the toy is for the child to match the colored ring 28 with the corresponding colored member 12 and to attach the ring to the hook member 16 thereof. For example, the second ring identified as 28b would have the same color as the member indicated at 12b and the child would position the ring 28b on the hook of member 12b. Ring 28c would match the color of member 12c and the child would stretch the elastic to secure the ring on the hook thereof.

When the child has matched all of the ring members to the respective hooks he has completed the game. The arrangement of the hooks and colors is such that the elastic members 26 are in overlapping relation to each other, as shown in dotted lines in FIG. 1. When the rings are attached to their respective hooks the elastic members are arranged in overlaying relationship, depending upon the order in which the rings were first attached to their respective hooks. In order to properly unhook the rings from the hooks to which they were attached, the order of detachment should be inverse to the order in which they were attached, that is, the last ring attached should be the first ring detached. This serves to teach the child how to figure out the superimposition of the elastic members and the order and sequence in which they should be attached and detached.

The modification shown in FIGS. 3 and 4 comprises a board 30 which has mounted thereon a plurality of spaced hook members 32, having a threaded shank 34 whereby they are secured to the board 30. Mounted on the board adjacent each hook is a piece of cloth or fabric bunched together to form a flower-like configuration 36. Each member 36 has a different color. The member 36 may be attached to the board through the hook member, as shown in FIG. 4, which would be positioned centrally of member 36.

A wire or bar 38 is secured, as at 39, to the lower end of the board and attached to this bar are elastic members 40, each supporting a ring 42 of a color to correspond to the color of one of the members 36. The child has to attach the colored ring 42 to the hook of the member 36, in the same manner as described in connection with FIGS. 1 and 2.

While the invention here is shown particularly in relation to colors, it will be understood that the invention need not be limited thereto, but that in place of the colored disk or fabric a picture of a particular animal or object may be substituted and a similar animal or object may be attached to the ring, so that the child may match or coordinate same. For example, as shown in FIG. 5, the disk or plate 14' may be molded to include an animal figure or any other recognizable object 44. The rings may be molded in the form of small disks 46, each with a corresponding animal figure or recognizable object 48 molded thereon. The small disks may be provided with an opening 50 whereby same are attached to the hooks or attaching pins 51 on the board.

It will be understood that various changes and modifications may be made from the foregoing without departing from the spirit and scope of the appended claims.

What is claimed is:

1. An educational toy comprising a board, a plurality of different color members on said board, attaching means in the vicinity of each said color member, a plurality of elongated, flexible elements each having one end connected to the board and having on the other end means attachable to said attaching means, each of said attachable means being of a different color and matching in color with the colors of said members.

2. A structure defined in claim 1 in which the attaching means is a hook and the attachable member is a ring.

3. A structure defined in claim 1 in which an elastic member connects the attachable member to the board.

4. A structure defined in claim 2 in which an elastic members connects the attachable member to the board.

5. A structure defined in claim 1 in which the color members each comprise a body or plate formed of a plastic material having an integrally formed hook thereon which forms the attaching means.

6. A structure defined in claim 5 in which the body or plate is provided with a rearwardly extending pin which engages an opening in the board for securement of said body to said board.

7. A structure defined in claim 1 in which the color member is a fabric material.

References Cited

UNITED STATES PATENTS

| | | | |
|---|---|---|---|
| 1,756,040 | 4/1930 | Taft | 35—24.4 |
| 2,313,874 | 3/1943 | Hume | 35—1 |
| 2,932,908 | 4/1960 | Gough | 35—9 |

FOREIGN PATENTS 121,989   8/1946   Australia.

EUGENE R. CAPOZIO, *Primary Examiner.*

W. W. NIELSEN, *Assistant Examiner.*